United States Patent [19]

Schatz

[11] Patent Number: 5,130,099
[45] Date of Patent: Jul. 14, 1992

[54] METHOD AND AN APPARATUS FOR THE CATALYTIC TREATMENT OF EXHAUST GASES OF INTERNAL COMBUSTION ENGINES

[76] Inventor: Oskar Schatz, Waldpromenade 16, D-8035 Gauting, Fed. Rep. of Germany

[21] Appl. No.: 535,417

[22] Filed: Jun. 8, 1990

[30] Foreign Application Priority Data

Jun. 7, 1989 [DE] Fed. Rep. of Germany ....... 3918596

[51] Int. Cl.⁵ ............................ F01N 3/10; F01N 3/18; F28F 13/08
[52] U.S. Cl. ..................................... 422/175; 422/168; 422/109; 60/274; 60/286; 165/147; 423/213.2
[58] Field of Search ................................ 422/168–171, 422/173, 175, 109, 110, 111; 165/146, 147; 60/274, 286; 423/212, 213.2, 213.5, 213.7

[56] References Cited

U.S. PATENT DOCUMENTS

| 3,943,709 | 3/1976 | Holt | 60/274 |
| 4,107,922 | 8/1978 | Wössner | 422/173 |
| 4,485,621 | 12/1984 | Wong et al. | 60/274 |
| 4,650,414 | 3/1987 | Grenfell | 422/173 |

FOREIGN PATENT DOCUMENTS 63-91499  4/1988  Japan ................................. 422/173

Primary Examiner—Douglas W. Robinson
Assistant Examiner—T. J. Reardon
Attorney, Agent, or Firm—Harness, Dickey & Pierce

[57] ABSTRACT

For the catalytic treatment of exhaust gases continuously flowing through a catalytic converter (14) from an IC engine, more particularly the IC engine of a vehicle, during operation at moderate temperatures the exhaust gases are heated by a heat storage means prior to their entry into the catalytic converter in a heating zone.

25 Claims, 1 Drawing Sheet

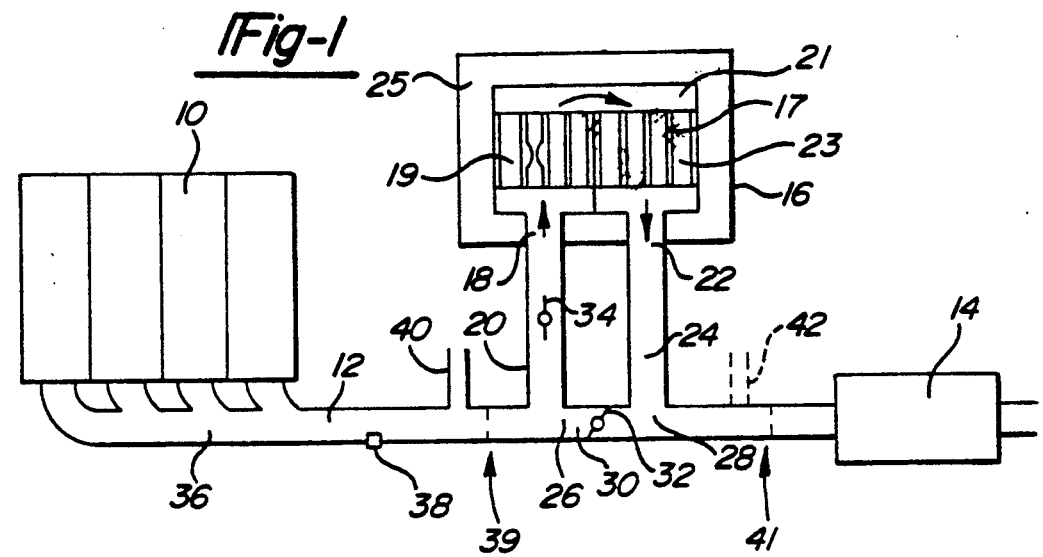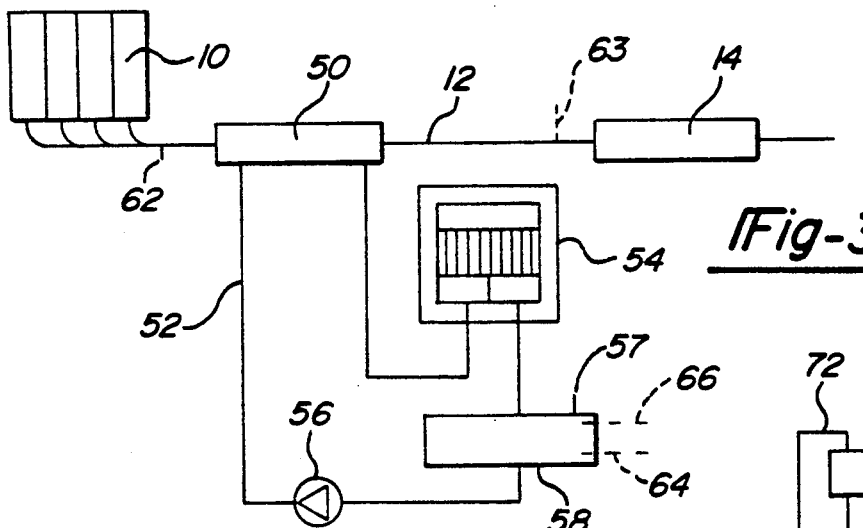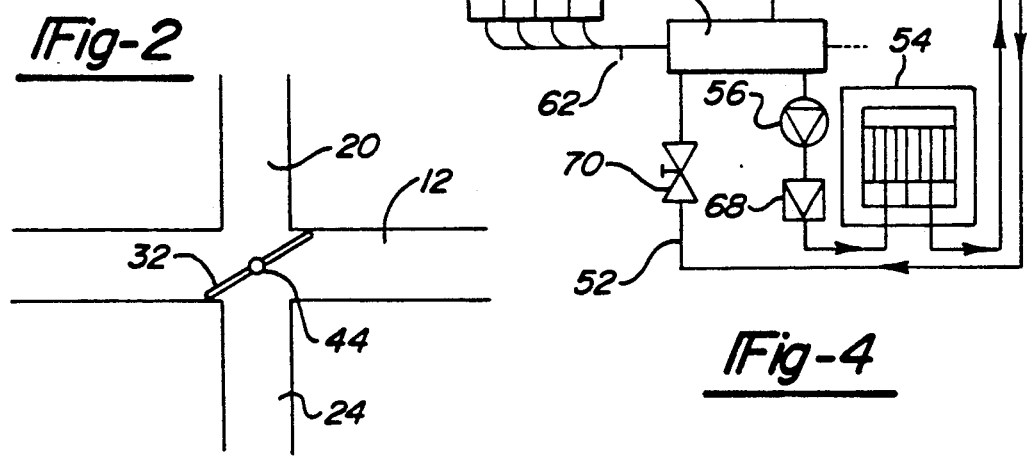

METHOD AND AN APPARATUS FOR THE CATALYTIC TREATMENT OF EXHAUST GASES OF INTERNAL COMBUSTION ENGINES

BACKGROUND OF THE INVENTION

The invention relates to a method for the catalytic treatment of exhaust gases of IC engines, and more particularly of engines used in vehicles, in which the exhaust gases continuously flow through a catalytic converter and also to an apparatus for performing the method.

When an IC engine is started from cold large amounts of noxious substances are emitted. Downstream catalytic converters call for a certain minimum temperature in order to become fully operational. Until this minimum temperature is reached the noxious substances are not converted and instead are discharged into the atmosphere.

Conventional three-way catalytic converters contain catalytic material for the oxidation of CO and unburnt hydrocarbons, and also material for the reduction of $NO_x$. Owing to the delay in reaction in the catalytic converter before the operational temperature is reached more particularly CO and uburned hydrocarbons are involved, whereas there is no substantial emission of $NO_x$ until the normal operating temperature is reached.

In order reduce this delay in the reaction of the catalytic converter a large number of different possibilities have been investigated —at least theoretically—for instance the electrical heating of the exhaust gases prior to their entry into the catalytic converter, the additional heating of the catalytic converter or the keeping, heated up by thermal insulation or by the use of heat storage means.

In the case of the electrical heating of the exhaust gases or the catalytic converter very high amperages are required, which, if they are to be supplied by electrical generators installed in as a standard in motor vehicles, involve expensive development.

Keeping catalytic converters hot by thermal insulation or by thermal storage leads to the problem of overheating, especially when the system is running under full load conditions.

SHORT SUMMARY OF THE PRESENT INVENTION

Accordingly one object of the present invention is to devise a method and an apparatus in which the catalytic conversion is commenced at the earliest possible instant with the result that the emission of noxious substances is reduced to a minimum.

A further aim of the invention is to achieve this while avoiding the additional use of electrical energy and furthermore avoiding the danger of overheating during operating under heavy loads.

A still further aim of the invention is in this respect to take into account requirements in connection with economic production.

In order to achieve these or other objects appearing from the present specification, claims and drawing, in operational ranges under a preset switch-over condition, and more especially at moderate exhaust gas temperatures and/or at low speeds of rotation and a low load, prior to their entry into the catalytic converter the exhaust gases are heated in a preheating zone by a heat storage device.

The heat storage means may be charged by waste heat from the engine so that the use of electrical energy is not required. The heat transferred from the heat storage means to the exhaust gas means that the catalytic conversion begins very early on, because the required minimum temperature of the catalytic material is reached or exceeded more rapidly. The discharge of heat from the heat storage means is continued until, owing to the exhaust gas temperature at the IC engine or, respectively, the temperature of the catalytic converter, additional transfer of heat to the exhaust gas is no longer necessary.

In accordance with a further expedient form of the invention, in operational states with moderate exhaust gas temperatures in the preheating range the exhaust gases are passed through heat storage means designed for a high efficiency at low speeds of rotation and low loading and when a preset switch-over condition is fulfilled—more especially at a high exhaust gas temperature and/or at high load or a high speed of the IC engine—the exhaust gases are passed directly to the catalytic converter, the heat storage means being bypassed, because the heat storage means designed in this manner entails an excessive back pressure at high speeds of rotation and/or at high load. Furthermore, the heat storage means would be thermally overloaded by the very high exhaust gas temperatures then occurring. Owing to this design it is possible for the heat storage means to be particularly compact in design, because for instance in the case of a gasoline engine running at a speed and load condition in which the exhaust gases are passed through the heat storage means, the amount of exhaust gas is less than one quarter of the amount which occurs at the design point of the catalytic converter. The compact design furthermore leads to a saving in space and to a reduction in costs. A further advantage provided by the bypassing of the heat storage means under a high load and/or at high engines speeds is the short time of operation of the heat storage means and the low aging rate due to this.

In accordance with another convenient feature of the invention the exhaust gases in the preheating zone are passed through a heat exchanger and it is only in operational states with moderate exhaust gas temperatures that a heating circuit is maintained between the heat exchanger and a heat storage means, there then being the possibility in accordance with a further development of the invention for the heat vehicle fluid circulating in the heating circuit to be drawn off from the heat exchanger, when the catalytic converter attains the minimum temperature required for the catalytic action.

It is conventional for vehicle engines—more especially if they are gasoline ones—to be started from cold with a fuel excess. During the starting up phase there is thus a danger that despite the heating of the exhaust gases by the heat storage means the catalytic oxidation of CO and of the unburned hydrocarbons will not take place or will not take place completely, because the proportion of air is not sufficient. It is thus a known practice to supply secondary air to the exhaust gases, this leading to an increase in temperature owing the postcombustion in the exhaust gas. In order not to reduce the uptake of heat by the exhaust gas in the heat storage means owing to a decrease in the temperature difference, there is a useful further development of the invention in accordance with which the secondary air is supplied to the exhaust gases between the preheating zone and the catalytic converter.

Since when stating up the IC engine the heat storage means very rapidly increases the exhaust gas temperature, the invention provides a particularly valuable further feature in accordance with which at least a part of the catalytic conversion proceeds on heat exchanging surfaces which are coated with oxidation catalyst and which are swept by the exhaust gas flowing in the preheating zone. The result of this is that even shortly after starting up there is an oxidative catalysis in the preconverter and the heat of reaction thereof heats the catalytic converter through which flow continuously takes place. In this case it is an advantage if secondary air is added to the exhaust gases even prior to the entry thereof into the preheating zone, because in this case the increase in temperature upstream from the preheating zone favors the catalytic oxidation in the preheating zone. Moreover, it is convenient if the temperature of the heat storage means is above the response temperature of the catalytic material.

In accordance with a particularly useful embodiment of the invention the exhaust gas is firstly heated by a heat storage means, and then secondary air is supplied to the exhaust gas for postcombustion and the exhaust gas enriched with the secondary air is passed through a catalyst coated heat storage means. Such a method of operation is particularly effective and may—as will appear from the ensuring account —by practiced with a relatively simple heat storage means with two chambers arranged four counter-current operation.

There has already been a proposal to arrange a small catalytic converter upstream from catalytic converters in order to shorten the response time, such small catalytic converter also having exhaust gas continuously flowing through it. Owing to the lesser volume the catalytic preconverter is able to heat up more rapidly and thus develop its effect of reducing the amount of noxious substances before the main catalytic converter. However, it produces undesired side effects, more particularly a high loss in pressure with effects on the engine power.

In accordance with an expedient further feature of the invention in a method in which the exhaust gas flows directly through the heat storage means, when the switch-over condition is fulfilled, the bypassing of the heat storage means is caused with a time delay serving for recharging the heat storage means and in the case of a manner of operation using a heat exchanger with a heating circuit the latter is interrupted when a given temperature threshold is exceeded.

An apparatus with an IC engine and a catalytic converter placed on the exhaust gas duct of the engine may be so designed in accordance with the invention that a heat storage means may be placed selectively in the exhaust gas duct between the IC engine and the catalytic converter, there being the provision in a convenient development of the invention that the heat exchanger is in the form of a heat storage means adapted to be heated by waste heat from the IC engine, such as a means storing heat as latent heat. Such storage means storing heat as latent heat only have to have a relatively small overall size in order to make the necessary amount of heat available, and they may be adapted for use in situations where space is at a premium and may be charged in a particularly simple manner with the waste heat of the engine so that a motor vehicle may be equipped with the apparatus in accordance with the invention in an economic manner.

A particularly convention form of the invention is one in which the heat storage means is designed for a high efficiency and a low load and low speeds of rotation of the IC engine in order to make sure of keeping the advantages due to the compact manner of construction already alluded to.

A further advantages development of the invention is possible in which the flow cross section of the heat storage means is reduced along its heat exchanging surfaces in order to increase the flow velocity above the value in the catalytic converter. Owing to the high flow velocity there is an increase in the heat transition coefficient or K-value, upon which the costs, the overall volume, the weight of a heat exchanger and its effectiveness depend to a great extent.

A further advantageous feature for accelerating the rise is temperature of the exhaust gas is possible in which a choke is arranged in the flow path extending via the heat storage means so as to cause exhaust gas back pressure at the engine and thus give rise to an increase in temperature.

It is possible for both features to be combined—in accordance with a particularly expedient form of the invention—if the choke is formed by the reduced cross section of the heat storage means.

In accordance with another preferred form of the invention the exhaust gas duct is provided with a connection, able to be turned on and off, for secondary air and placed between the heat storage means and the catalytic converter.

A further possible and especially useful development of the invention is one in which at least a part of the heat exchange surface, provided for the exhaust gas, of the heat storage means is coated with oxidation catalyst, the exhaust gas duct then—preferably upstream from the heat storage means—being provided with a connection for the secondary air which can be turned on and off.

A particularly simple and effective design is one in which the heat storage means comprises two chambers which are arranged in parallel and through which the exhaust gas flows in opposite directions, that is to say in counter-current, the outlet port of the first chamber and the intake port of the second chamber being connected together by a direction changing chamber, which is provided with a connection for secondary air, and the heat exchanger surface swept by the exhaust gas of the second chamber is coated with oxidation catalyst.

A further possible form of the invention is such that in the section of the exhaust gas duct bypassing the heat storage means there is a choke flap able to be set as desired between in an open and a closed setting. The means that it is possible to produce a gradual transition from exhaust gas heating by the heat storage means to unheated operation.

In order to avoid overheating of the heat storage means, in accordance with one further convenient development of the invention the section of the exhaust gas duct on which the heat storage means is placed is able to be shut off.

It is possible to dispense with the necessity of having this shutting off device, which involves higher costs, if in accordance with another preferred feature of the invention the exhaust gas duct is fitted with a choke flap arranged to pivot about an axis extending through the exhaust gas duct, and in a transverse plane containing this axis of the exhaust gas duct two branch ducts are connected with the exhaust gas duct, such branch ducts being diametrically opposite to each other in relation to this axis and one of such branch ducts is connected with the port leading into the heat storage means and the other is connected with the port leading from the heat storage means, and when it is in the shut setting the choke flap is set obliquely to the direction of flow through the exhaust gas duct so that it separates the two branch ducts from each other.

In the case of such an arrangement there is no pressure differential between the ports of the two branch ducts so that when the choke flap is opened there will be no flow via the heat storage means. If the choke flap is in its shut setting, the separation of the two branch duct ports from each other will mean that the exhaust gas flow will be via the heat exchanger.

In the case of an intermediate setting of the choke flap only a part of the exhaust gas will flow through the heat storage means so that the heat storage means may still be charged, when the switch-over condition is fulfilled, but before the exhaust gas temperature is so high as to involve damage to the heat storage means.

In another advantageous form of apparatus for performing the method a heat exchanger is arranged between the IC engine and the catalytic converter, which is conducted by means of a heating circuit containing a heat transport fluid with a heat storage means, which may also be a heat storage means adapted to be charged by waste heat from the IC engine.

It is preferred for the heating circuit to include a pump able to be turned on and off, a first modification of this design being such that the heat exchanger is at a higher level than a compensating container, arranged in the heating circuit, for the heat vehicle fluid and the pump is arranged below the steady state level in the compensating container in the pumping direction between the compensating container and the heat exchanger so that when the pump is turned off the flowable heat vehicle fluid will flow under its own weight from the heat exchanger and transfer of heat from the heat exchanger to the heat storage means and thus an excessive thermal loading of the heat storage means will be avoided under conditions involving a high load and/or high speeds of rotation.

Another modified form of the invention is possible in which the heat exchanger is placed at a lower level than a compensating container in the heating circuit for the heat vehicle fluid, a shut off valve is placed in the direction of flow between the compensating container and the heat exchanger and between the heat exchanger and the compensating container there is, in the follower order, the pump, a check valve and the heat storage means. In this case it is possible for the heat exchanger to be emptied by the pump when the shut off valve is shut. As soon as the shut off valve is opened the heat vehicle fluid will fill with the heat vehicle fluid again owing to gravity, whereas in the case of the first possible form of the invention with the compensating container the heat exchanger has to be filled by pump.

In accordance with another expedient form of the invention it is possible for the exhaust gas duct to be provided with a connection, able to be turned on and off, for the secondary air between the heat exchanger and the catalytic converter.

It is furthermore possible, in accordance with a particularly preferred from of the invention, for at least a part of the heat exchanger to be coated with a material adapted to cause catalytic oxidation, it then being convenient if, upstream from the heat exchanger the exhaust gas duct is provided with a connection, able to be switched on and off, for secondary air.

In order to provide the most effective insulation of the heat storage means, the invention contemplates a preferred setup in which the intake and the outlet on the lower side of the heat storage means extend through vertical duct means having a sufficient length to provide a thermally insulating barrier layer and extending through the thermal insulation of the heat storage means.

The invention will now be described in more detail with reference to the following account relating to the working examples thereof shown in the drawing.

LIST OF THE SEVERAL VIEWS OF THE DRAWING

FIG. 1 is a diagrammatic view of the exhaust gas system of a vehicle engine exhaust gas system with a heat storage means.

FIG. 2 shows a modified form of the connection of the heat storage means with the exhaust gas duct FIG. 3 is a view, similar to that of FIG. 1, of a first modified embodiment of an exhaust gas system with a heat storage means.

FIG. 4 shows a second possible embodiment of this exhaust gas system.

DETAILED DESCRIPTION OF WORKING EMBODIMENTS OF THE INVENTION

The exhaust gases coming from an IC engine 10 are led off via an exhaust gas duct 12, which through a catalytic converter 14 continuously swept by the gas. Between the engine 10 and the catalytic converter 14 a heat storage means 16 is placed in parallel to the exhaust gas duct 12 and the intake chamber 18 of the heat storage means is connected via a branch duct 20 with the exhaust gas duct 12, and between the branch point 26 of the branch duct 20 and the intake end 28 of the branch duct 24 there is a section 30, bypassing the heat storage means 16, of the exhaust gas duct 12.

The intake chamber 18 is followed by a first storage chamber 19, through which exhaust gas flows. Parallel to this first storage chamber 19 a second storage chamber 23 is arranged, which is connected with the outlet chamber 22 and into which the exhaust gas, emerging from the first storage chamber 19, passes via a direction changing chamber 21 covering over the two storage chambers 19 and 23 and it flows in it to the outlet chamber 22.

The chambers 18, 19, 21, 22 and 23 are enclosed by an insulating enclosure 25.

The heat storage means is for example in the form of a latent heat storage means which is designed for high efficiency at low engine speeds. Furthermore, the heat exchange surfaces swept by the exhaust gas are coated with an oxidation catalyst. In order to be able to supply the exhaust gas selectively via the heat storage means 16 when desired, the section 30 is provided with a choke flap 32 able to be moved steplessly between an open position and a closed position as shown in the figure. In order to ensure that when the choke flap is fully opened there is no possibility of the pressure differential causing a flow of exhaust gas between the branch duct 26 and the inlet port 28 through the heat storage means 16, the flow path, for instance the part 20, with the heat storage means connected therein includes a shut off valve, for instance in the form of a choke flap 34.

If for instance a probe 38 installed at the outlet port of the exhaust gas manifold 36 indicates an operational state in which further transfer of heat from the heat exchanger 16 to the exhaust gas for initiation or maintenance of the catalytic action is no longer be required, the choke flap 34 may be shut and the flap 32 may be opened, it then being possible to have a gradual transition owing to the stepless adjustability of the choke flaps 32 and 34. Preferably, however the flow path via the heat storage means is only shut down with such an ample time lag that the storage means is able to be recharged by the exhaust gases which in the meantime will be at the operational temperature.

In the case of exhaust gas temperature above a given limit value the heat storage means 16 should not receive exhaust gas in order to avoid overheating or damage to it. Even in the case of heavy loading of the engine exhaust gas should not flow through the heat exchanger 16, because its back pressure has an undesired effect.

Therefore the control of the flow of exhaust gas through the heat storage means 16 may be such that this flow is only interrupted when the exhaust gas temperature and/or the engine load exceeds a given value. In this respect this control condition may provided in addition for safety, or it may be the only control condition, so that the heat storage means is continuously being charged as long as the flow of exhaust gas through heat storage means 16 does not have any untoward effects.

In order to ensure that during starting with a fuel excess at the engine 10 there is sufficient air available for oxidation even at the coated heat exchanger surfaces in the heat storage means, a secondary air connection 40 is provided upstream from the heat storage means 16.

The postcombustion made possible by the secondary air shortens the time elapsing between starting the engine and the commencement of the catalytic action in the heat storage means 16. Furthermore, the heat of reaction aids in rapidly bringing the catalyst up to the necessary operating temperature.

If the heat storage means 16 does not contain any oxidation catalyst, the secondary air connection should be arranged upstream from the catalytic converter (and not further downstream) as is indicated by the broken lines at 42 in order to ensure that the postcombustion made possible by the secondary air is not able to heat up the exhaust gas upstream from the heat storage means 16 and as a result reduce the uptake of heat in the heat storage means, while on the other hand this heating up upstream from the catalytic converter 14 is desired.

FIG. 2 shows a modified form of the connection of the heat storage means 16 with the exhaust gas duct 12 making it possible to dispense with the choke flap 34. The branch duct 26 and the inlet port 28 are in this respect so arranged opposite each other in the cross section plane (taken through the exhaust gas duct 12) containing the axis 44 of the choke flap 32 that their geometrical connecting line intersects this axis 44 at a right angle. In the closed position this the choke flap 32 is oblique to the direction of flow through the exhaust gas duct 12, for instance at 45°. In the closed setting apparent in FIG. 2, the choke flap 32 separates the branch duct 26 and the inlet port 28 from each other so that the exhaust gas is completely passed through the heat storage means 16. If the choke flap 32 is opened, there will be no pressure differential between the branch duct 26 and the inlet port 28 so that no flow will be produced through the heat storage means 16 except in the case of choke action when the choke flap 32 is not completely opened.

In the working embodiments shown in FIG. 3 a heat exchanger 50 is arranged on the exhaust gas duct 12 between the engine 10 and the catalytic converter 14, such heat exchanger 50 furthermore being included in a heating circuit 52, which includes a hat storage means 54. The heat circuit furthermore comprises a pump 56 and a storage means 58 provided with a ventilating means 57, for the heat vehicle fluid circulating the heating circuit.

In the case of operation with a liquid heat vehicle the vertical length of the branch ducts 20 and 24 extending through the insulating zone 25 is in each case such that an insulating barrier layer is able to form between the hot heat vehicle fluid in the storage means 54 and the heat vehicle fluid which is located in the heating circuit outside the insulating zone 25 and which cools down when the pump 56 is not in operation.

Preferably the heat exchange surfaces, which are swept by the exhaust gas and are not shown in detail in the drawing, in the interior of the heat exchanger 50 are coated with an oxidation catalyst so that in the heat exchanger 50, just as has been already described for the heat storage means 16 having the exhaust gas flowing directly through it, an oxidation of CO and postcombustion of the unburned hydrocarbons and, respectively, soot may take place, the heat of reaction contributing to increasing the temperature in the exhaust gas and thus to an early commencement of operation in the catalytic converter 14.

In this respect the requirement for air is taken care of by the secondary air connection 62. If the heat exchanger should be without any coating of oxidation catalyst, the secondary air connection will be arranged between the heat exchanger 50 and the catalytic converter 14, as is indicated by broken lines at 62.

In the case of the embodiment shown in FIG. 3 the heat exchanger 50 is placed at a higher level than the compensating container 58 so that when the pump 56 is not in operation the flowable heat vehicle fluid flows away owing to the effect of gravity from the heat exchanger 50, the level in the compensating container then rising from the operating level 64 to the neutral or resting level 66. Because the vehicle fluid has then left the heat exchanger 50, the high temperature levels, which would otherwise damage the heat storage means 54, are not able to affect it.

As soon as the heating circuit 52 is to be made operational again, the pump 56 is switched on so that the heat vehicle fluid is again caused to flow via the heat exchanger 50 to the heat storage means 54 and in doing so either transfers stored heat in the heat exchanger 50 to the exhaust gas or for charging up the heat storage means 54 transfers heat from the exhaust gas to the heat storage means 54.

In the modified embodiment shown in FIG. 4 the compensating container 58 is at a higher level than the heat exchanger 50 and between the heat exchanger 50 and the heat storage means 54 there are, arranged in an order following the direction of pumping the pump 56, a check valve 68 and the heat storage means 54. In the direction of pumping after heat storage means 54 there is a check valve 70 which is placed between the heat storage means 54 and the heat exchanger 50.

In this embodiment of the invention the heat exchanger 50 is emptied by the pump 56, which—after shutting of the check valve 70—pumps the heat vehicle fluid into the compensating container 58, whence it is prevented from flowing back by the check valve 68 between the heat storage means 54 and the pump 56. After the opening of the check valve 70 the heat vehicle fluid flows under its own weight into the heat exchanger 50. The heat exchanger 50 and the compensating container 58 are connected with each other by an air equalizing duct 72.

In order to intensify the heat exchange in the heat exchanger 16 the flow velocity of the exhaust gas along the heat exchange surfaces in the heat exchanger may be increased to be greater than the flow velocity in the catalytic converter by reducing the flow cross section adjacent to such heat exchanger surfaces.

In order to ensure a more rapid rise in temperature in the exhaust gas it is furthermore possible for a choke to be provided in the flow path leading to the heat storage means 16 so as to cause back pressure at the engine. Such a choke may—as indicated at 39—be arranged upstream from the heat storage means 16 or—as indicated at 41—downstream from the heat storage means 16. However, it is furthermore possible for the reduction in the flow cross section (as mentioned above) in the heat storage means to serve as choke.

I claim:

1. A method for the catalytic treatment of exhaust gases of IC engines, and more particularly of engines used in vehicles, in which the exhaust gases continuously flow through a catalytic converter, the engines including an exhaust gas means for exiting exhaust gases from the engine to the catalytic converter, a heat storage means coupled with the exhaust gas means, and means for controlling passage of exhaust gas through the heat storage means; said method comprising:

charging said heat storage means with exhaust gases;

passing exhaust through said charged heat storage means when temperature of said exhaust gas is below a predetermined level;

transferring heat from said heat storage means to said exhaust gas below said predetermined level to preheat said exhaust gas;

passing said preheated exhaust gas into said catalytic converter;

recharging said heat storage means with exhaust gas with a temperature above said predetermined level; and terminating exhaust gas flow through said heat storage means by said control means after charging of said heat storage means and passing exhaust gas directly into said catalytic converter.

2. A method for the catalytic treatment of exhaust gases of IC engines, and more particularly of engines used in vehicles, in which the exhaust gases continuously flow through a catalytic converter, the engines including: an exhaust gas means for exiting exhaust gases from the engine to the catalytic converter, a heat storage means coupled with the exhaust gas means, a heat storage means, a heat vehicle fluid within a heating circuit which couples said heat storage means to said heat exchanger, and means for controlling passage of said heat vehicle fluid through the heat storage means; said method comprising:

passing heated heat vehicle fluid from said heat storage means to said heat exchanger when temperature of said exhaust gas is below a predetermined level;

transferring heat from said heat exchanger to said exhaust gas below said predetermined level to preheat said exhaust gas;

passing said preheated exhaust gas into said catalytic converter;

recharging said heat storage means with heated heat vehicle fluid in said heating circuit when said exhaust gas is at a temperature above said predetermined level; and terminating heating vehicle fluid flow through said heat storage means by said control means after charging of said heat storage means.

3. The method as claimed in claim 2, further comprising drawing off the heat vehicle fluid circulating in the heating circuit from the heat exchanger when the catalytic converter has attained the minimum temperature required for its catalytic action.

4. The method as claimed in claim 1 comprising supplying secondary air to the exhaust gases between the heat storage means and the catalytic converter.

5. The method as claimed in claim 1 further comprising performing at least a part of the catalytic conversion in the heat storage means at heat exchange surfaces swept by the exhaust gas and coated with an oxidation catalyst.

6. The method as claimed in claim 5, further comprising adding secondary air to the exhaust gases before the exhaust gases reach the heat storage means.

7. The method as claimed in claim 1 wherein said heat storage means includes catalytically coated surfaces, further comprising initially heating the exhaust gas by said heat storage means and supplying secondary air for further combustion to the exhaust gas to enrich the exhaust gas with the secondary air and passing said exhaust gas and secondary air through said catalytically coated heat storage means.

8. An apparatus for preheating exhaust gas entering a catalytic converter comprising:

an internal combustion engine;

exhaust means for exhausting gas from said internal combustion engine;

a catalytic converter coupled with said exhaust means for receiving the exhaust gas from said internal combustion engine;

heat storage means coupled with said exhaust means between said internal combustion engine and said catalytic converter; and means for controlling passage of exhaust gas into said heat storage means and said catalytic converter such that said storage means is charged by exhaust gas and when exhaust gas is passed through said heat storage means at a temperature below a predetermined level, heat is transferred from the heat storage means to the exhaust gas to preheat the exhaust gas, the preheated exhaust gas is passed through the catalytic converter, said storage means is recharged with exhaust gas at a temperature above the predetermined level and exhaust gas flow through said heat storage means is terminated by said control means and said flow is passed directly through said catalytic converter via said exhaust means.

9. The apparatus as claimed in claim 8, wherein said heat storage means has heat exchanging surfaces and a flow cross section for the passage of exhaust gas; the flow cross section of said heat storage means is reduced along said heat exchanging surfaces in order to increase flow velocity of the exhaust gas above the flow velocity in the catalytic converter.

10. The apparatus as claimed in claim 8 wherein a choke is arranged in the flow path passing through heat storage means to cause back pressure at the engine.

11. The apparatus as claimed in claim 9 wherein the exhaust gas means is provided with a connection able to be turned on and off for secondary air between the heat storage means and the catalytic converter.

12. The apparatus as claimed in claim 9 wherein at least a part of the heat exchange surface for the exhaust gas of the heat storage means is coated with an oxidation catalyst.

13. The apparatus as claimed in claim 12, wherein upstream from the heat storage means the exhaust gas means is provided with a connection, able to be turned on and off, for secondary air.

14. The apparatus as claimed in claim 12, wherein the heat storage means comprises two chambers arranged parallel to each other so that exhaust gas is able to flow in opposite directions therethrough, said first chamber receives exhaust gas from said exhaust means and said second chamber exits exhaust gas into said exhaust means, and the outlet of the first chamber and the inlet of the second chamber being connected by a direction changing chamber, and in that the heat exchange surface for the exhaust gas of the second chamber is coated with oxidation catalyst.

15. The apparatus as claimed in claim 9 wherein a choke flap is arranged in the exhaust means, such that said choke flap enables exhaust gas to bypass the heat storage means directly to said catalytic converter of the exhaust gas duct and is able to be adjusted steplessly between a closed and an open setting.

16. The apparatus as claimed in claim 9 wherein said exhaust means includes a section, which includes the heat storage means (16), which is able to be shut off.

17. The apparatus as claimed in claim 15, wherein said exhaust means includes an exhaust gas duct with said chock flap, adapted to pivot about an axis athwart the exhaust gas duct, said exhaust gas duct has incoming and outgoing branch ducts which are arranged diametrically opposite to each other with reference to said axis and are connected to the exhaust gas duct in a cross section plane containing said axis, and the incoming branch duct is connected with a port leading into the heat storage means and the outgoing branch duct is connected with an outlet port from the heat storage means, whereby in the shut position of the choke flap, the flap is set so obliquely to the direction of flow of the exhaust gas duct that is separates the two branch ducts from each other.

18. An apparatus for preheating exhaust gas entering a catalytic converter comprising:
an internal combustion engine;
exhaust means for exhausting gas from said internal combustion engine;
a catalytic converter coupled with said exhaust means for receiving the exhaust gas from said internal combustion engine;
heat storage means coupled with said exhaust means between said internal combustion engine and said catalytic converter, said heat exchanger connected to a heat storage means by a heating circuit through which heat vehicle fluid flows such that when exhaust gas is passed through said heat exchanger at a temperature below a predetermined level, heat is transferred from the heat storage means to the heat vehicle fluid to the heat exchanger to the exhaust gas to preheat the exhaust gas, the preheated exhaust gas is passed through the catalytic converter, said heat storage means is recharged with heat from the exhaust gas via heating of the heat exchanger and heating vehicle fluid when said exhaust gas is at a temperature above the predetermined level.

19. The apparatus as claimed in claim 18, wherein the heating circuit is provided with a pump selectively operable in the heating circuit.

20. The apparatus as claimed in claim 19, wherein the heat exchanger is placed at a higher level than a heat vehicle fluid compensating container arranged in the heating circuit, and in that the pump is arranged below the heat vehicle fluid level in the compensating container and in the direction of pumping between the compensating container and the heat exchanger.

21. The apparatus as claimed in claim 19, wherein the heat exchanger is placed at a lower level than a heat vehicle fluid compensating container arranged in the heating circuit, in that in the direction of pumping between the compensating container and the heat exchanger a shut off valve is arranged and in that between the heat exchanged and the compensating container the following are arranged in order; the pump, a check valve and the heat storage means.

22. The apparatus in claim 18 wherein between the heat exchanger and the catalytic converter the exhaust gas means is provided with a connection, able to be switched on and off, for secondary air.

23. The apparatus as claimed in claim 18 wherein at least a part of the heat exchanger surface of the heat exchanger is coated with an oxidation catalyst.

24. The apparatus as claimed in claim 23, wherein upstream from the heat exchanger the exhaust means is provided with a connection, for secondary air which is able to be turned on and off.

25. The apparatus as claimed in claim 18 wherein said heat storage means includes thermal insulation and an inlet port and an outlet port on the lower side of the heat storage means which extend through the thermal insulation of the heat storage means for a sufficient vertical distance to form a heat insulating barrier layer.

* * * * *